United States Patent Office 3,294,718
Patented Dec. 27, 1966

3,294,718
METHOD FOR PREPARING BLOCK COPOLYMERS
Robert C. Antonen, Midland, Mich., assignor to Dow Corning Corporation, Midland, Mich., a corporation of Michigan
No Drawing. Filed Apr. 20, 1964, Ser. No. 361,212
14 Claims. (Cl. 260—18)

This invention relates to a method for preparing silicon-containing block copolymers. More specifically this invention relates to the preparation of block copolymers consisting of blocks of essentially linear silicon-containing material and blocks of resinous silicon-containing materials.

The preparation of block copolymers remains a challenge to those skilled in the art of polymer chemistry. The ideal block copolymer would be one which contains at least two types of blocks in which the blocks of one kind would all be equal in size and the blocks of the other kind would be equal in size. For example, a block copolymer composed of blocks of A units and blocks of B units would be constructed as follows if the blocks containing A units had four units each and the block containing B units had six units each;

... AAAABBBBBBAAAABBBBBBAAAABBBBBB ...

Of course, block copolymers are very seldom, if ever, so constructed. The requirements would involve preparing each block such that there were only four A units per block and six B units per block, no more and no less. The closer we approach this ideal structure, the more consistent the properties of the block copolymer. Practically, block copolymers are not composed of blocks where each kind of block has the same number of units. An example would be a block copolymer composed of A and B units where the average number of A units in each block is four, but actually there is present blocks containing 3, 4 and 5 A units, and the average number of B units per block is 6, but actually there is present blocks containing 5, 6 and 7 B units. The block copolymer would therefore be constructed such as illustrated below:

... AAABBBBBBBAAAABBBBBBAAAAABBBBB ...

The problems can readily be observed from the foregoing discussion. The blocks which are used to construct the block copolymer are basic to the final construction of the block copolymer. Also the method of reacting the blocks or forming the block copolymer is basic to the properties of the final product. The method used should give block copolymers which have optimum properties, which form consistent products, and which can be used for wide variation of block sizes.

An objective of the present invention is to provide a method of preparing silicon-containing block copolymers having both linear and resinous blocks over wide ranges of block sizes.

Another objective is to provide a method which gives consistent results.

Still another objective is to provide an economical method which gives excellent copolymers.

Other objectives will be apparent from the following description of the invention.

The present invention relates to a method of preparing an organosilicon block copolymer comprising (I) mixing with sufficient agitation to form a dispersion
   (A) a diorganopolysiloxane of the general formula $[(CH_3)_2SiO]_s[(C_6H_5)(CH_3)SiO]_t$
   $[(C_6H_5)_2SiO]_u[RSiO_{3/2}]_v[R_2SiO]_w$ where
   R is a monovalent radical selected from the group consisting of methyl, phenyl, ethyl and vinyl radicals, the average number of organo groups per silicon atom is from 1.9 to 2.0,
   $s$ is an integer from 0 to 180,
   $t$ is an integer from 0 to 180,
   $u$ is an integer from 0 to 90,
   $v$ is an integer from 0 to 18,
   $w$ is an integer from 0 to 90,
   the sum of $s+t+u+v+w$ has an average value from 5 to 180, the sum of $s+t$ is at least 50 mole percent of $s+t+u+v+w$, $v$ has a maximum value of 10 mole percent of $s+t+u+v+w$, and there are at least two silicon-bonded functional radicals per molecule selected from the group consisting of halogen atoms, alkoxy radicals and hydroxyl radicals, with
   (B) enough water to form a dispersion consisting essentially of
      (1) an aqueous phase, and
      (2) an organopolysiloxane phase,
(II) dissolving
   (C) an organosilicon compound selected from the group consisting of
      (a) an organosilane of the average general formula $R'_xSiX_{4-x}$ where
         R' is a monovalent radical selected from the group consisting of hydrocarbon radicals, halohydrocarbon radicals, cyanohydrocarbon radicals and hydrogen atoms,
         X is a halogen atom,
         $x$ has an average value of from 1 to 1.4,
      (b) a hydrocarbonoxy silicon compound of the general unit formula

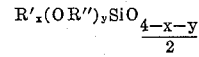

where
         R' is a monovalent radical selected from the group consisting of hydrocarbon radicals, halohydrocarbon radicals, cyanohydrocarbon radicals and hydrogen atoms,
         R" is a monovalent hydrocarbon radical having from 1 to 6 carbon atoms,
         $x$ has an average value of from 1 to 1.4,
         $y$ has an average value of from 0.10 to 3,
         the sum of
         $x+y$ does not exceed 4, and
      (c) mixtures of (a) and (b), in
   (D) organic solvent to form a solution containing at least 40 weight percent of said solvent,
(III) adding the solution from (II) to the dispersion from (I) with sufficient agitation to maintain the dispersion, there being present with (A) and (C) enough organic solvent to give a concentration of at least 40 weight percent based on the weight of (A) and (C) of an organic solvent, there being present a catalytic quantity of an acid catalyst which is not a siloxane bond rearranging catalyst, and
(IV) separating the aqueous phase from the organopolysiloxane phase and removing the residual acid and water from the organopolysiloxane phase,
(V) bodying the organopolysiloxane phase in the presence of a condensation catalyst, and
(VI) concentrating the organosilicon block copolymer by removing the organic solvent.

A method of producing the organosilicon block copolymer to be economical and practical needs to be useable with a large selection of reactants and needs to give consistent results. The method of the present invention has such properties. The results are consistent, a large selection of reactants are operable, the number of steps needed to obtain a product are few and uncomplicated and washing and neutralizing steps have been eliminated.

The diorganopolysiloxane (A) is mixed with water in amounts such that when adequately agitated a dispersion is formed. The diorganopolysiloxane (A) can be mixed with the water in any conventional manner. The diorganopolysiloxane can be previously dissolved in an organic solvent or the organic solvent can be added after the water and the diorganopolysiloxane are mixed or any other method of combining the water and the diorganopolysiloxane is operable. Organic solvent is not a requirement for the mixture formed in (I) but the presence of some organic solvent is preferred. The preferred amount of organic solvent is from 5 to 90 weight percent based on the weight of diorganopolysiloxane (A). The agitation in mixing the diorganopolysiloxane (A), and the water (B), must be sufficient such that a state of dispersion exists as long as agitation is continued. Any conventional method of agitation can be used. The term "dispersion" refers to a state in which two essentially immiscible liquids exist in a finely divided state and the particles are essentially evenly mixed throughout each other. The dispersion of the present invention consists essentially of two phases, (1) an aqeous phase and (2) an organopolysiloxane phase. The organopolysiloxane phase can be the diorganopolysiloxane (A) or it can be a mixture of the diorganopolysiloxane and the organic solvent. The dispersion is usually formed within a short period of time, 5 to 15 minutes, once the materials are mixed and agitation is begun, but the length of time is not critical as long as the dispersion forms and only considerations of economy limits the maximum time used. The temperature is not critical and no heating is required, but slight heating to reduce the viscosity and aid dispersion is permitted. No economic advantages are seen in heating the dispersion to high temperatures and the heating could be detrimental.

The amount of water (B) necessary for the present invention is that amount which is enough to form a dispersion. The amount to form a dispersion will vary depending upon the ingredients used, but it is preferred that at least 25 weight percent based on the weight of the diorganopolysiloxane (A) of water is used. Another condition which is required is that the amount of water must be at least equal to the theoretical amount of water required to hydrolyze the hydrolyzable groups on the silanes or siloxanes (C).

The diorganopolysiloxane (A) is either a homopolymer or a copolymer. The diorganopolysiloxane is a polymer composed of siloxane units forming a general unit formula $$[(CH_3)_2SiO]_s[(C_6H_5)(CH_3)SiO]_t$$
$$[(C_6H_5)_2SiO]_u[RSiO_{3/2}]_v[R_2SiO]_w$$

where R is a monovalent radical of methyl, phenyl, ethyl or vinyl radical and both R's can be the same or different on the same silicon atom in $R_2SiO$ units. The average total number of silicon atoms in a siloxane chain has a maximum of 180 silicon atoms, thus $s+t+u+v+w$ has a maximum value of 180. The average minimum number of units per chain is 5. The arrangement of the general formula is not intended to show the arrangement of the units in the diorganopolysiloxane chain. The units of any one specie can be distributed anywhere throughout the diorganopolysiloxane chain. Each subscript is used to indicate the number of each specie permitted in the chain.

The diorganopolysiloxane can be composed of 100 mole percent of either $[(CH_3)_2SiO]$ units or $$[(C_6H_5)(CH_3)SiO]$$

units. The value of $s$ can vary from 0 to 180, and the value of $t$ can vary from 0 to 180. The sum of $s+t$ is at least 50 mole percent of the total number of units which is found by adding $s+t+u+v+w$. A mole of a disorganopolysiloxane is defined in this invention as being equal to the formula weight of a unit, such as a mole of dimethylpolysiloxane is equal to the formula weight of $$[(CH_3)_2SiO]$$

which is 74. If a diorganopolysiloxane has an average chain length of 50 units, the sum of $s+t$ is equal to at least 25.

The present method is also operative with other diorganopolysiloxanes containing units other than dimethylsiloxane and phenylmethylsiloxane units. The diorganopolysiloxane can contain up to 50 mole per cent of $[(C_6H_5)_2SiO]$ units, thus $u$ has a value from 0 to 90. Other $[R_2SiO]$ units can be present up to 50 mole percent where R can be methyl, phenyl, ethyl or vinyl. Examples of $[R_2SiO]$ units are $[(CH_3)(CH_2=CH)SiO]$ $$[(C_6H_5)(CH_2=CH)SiO], [(C_2H_5)_2SiO]$$
$$[(C_2H_5)(CH_3)SiO], [(C_6H_5)(C_2H_5)SiO]$$
$$[(C_2H_5)(CH_2=CH)SiO], \text{ and } [(CH_2=CH)_2SiO]$$

The value of $w$ can be from 0 to 90. The number of units of the unit formula $[RSiO_{3/2}]$ can be no more than 10 mole percent of the total number of units. Thus, units of $[CH_3SiO_{3/2}]$, $[C_6H_5SiO_{3/2}]$, $[C_2H_5SiO_{3/2}]$, and $$[CH_2=CHSiO_{3/2}]$$

can be no more than 10 mole percent of $s+t+u+v+w$ and $v$ can have a value from 0 to 18.

The diorganopolysiloxane has at least two functional radicals per molecule, halogen atoms, alkoxy radicals or hydroxyl radicals. The minimum number of functional radicals, two, is critical in that the method of producing the block copolymer requires that at least two functional radicals be present. Example of operative functional radicals are halogens such as chlorine atoms, bromine atoms and iodine atoms; alkoxy radicals such as methoxy, ethoxy, butoxy and isopropoxy, and hydroxyl radicals. The preferred functional radicals are chlorine atoms and hydroxyl radicals.

The diorganopolysiloxane (A) and water (B) can be in the presence of an organic solvent. The manner of getting the organic solvent into the system is not critical. The organic solvent can be added at any point or with any component. If the organic solvent is used the most convenient method is to dissolve the diorganopolysiloxane in the organic solvent before forming the dispersion with the water. The best results are obtained when a solution of the diorganopolysiloxane in the organic solvent is such that the solution contains from 30 to 70 weight percent based on the diorganopolysiloxanes (A) of organic solvent. The amount of organic solvent is not critical and the reaction can be preformed without organic solvent being present in the diorganopolysiloxane-water dispersion.

The organic solvent can be a single compound or a mixture of compounds. Suitable organic solvents include hydrocarbons such as heptane, cyclohexane, methylcyclopentane, benzene, toluene, xylene, naphtha and mineral spirits; halocarbons and halohydrocarbons such as perchloroethylene and chlorobenzene; ethers such as diethyl ether, methylamyl ether, 2,2'-dibromodiethyl ether and dibutyl ether; and esters such as butylacetate. Other suitable organic solvents include such solvents as tetrahydrofuran, acetonitrile and ethylene glycol dimethyl ether. Organic solvents which produce the best results are those which are immiscible with water. The most preferred organic solvents include toluene, xylene, perchloroethylene, chlorobenzene and dibutyl ether. These preferred solvents provide the best conditions for azeotroping the residual acid and water from the organopolysiloxane phase in step (IV).

The second step of the present method (II) requires that the organosilicon compound (C) be dissolved in an organic solvent. No special techniques of dissolving the silanes or siloxanes in the organic solvent are required.

The organic solvent can be any of the organic solvents as shown above. Preferably, when an organic solvent is used in (I) the same solvent is used in (II) although this is not a critical requirement. The amount of organic solvent (D) used in (II) must be at least 40 weight percent based on the weight of the organosilicon compound (C). If less than 40 weight percent organic solvent is used, the reaction in (III) will produce a material which contains gel particles or which is essentially a gel.

The organosilicon compound (C) can be either a silane or a siloxane. The organosilane (a) has the average general formula $R'_xSiX_{4-x}$ where $x$ has an average value of from 1 to 1.4, the most preferred value of $x$ is from 1 to 1.3. X is a halogen such as chlorine, bromine or iodine.

R' is a monovalent hydrocarbon radical or a monovalent halohydrocarbon radical. Examples of monovalent hydrocarbon radicals are alkyl radicals, such as methyl, ethyl, propyl, hexyl, 3-methylpentyl, dodecyl and octadecyl; alkenyl radicals such as vinyl, allyl, methallyl and hexenyl; aryl radicals, such as phenyl, tolyl, xenyl, xylyl and naphthyl; aralkyl radicals such as benzyl, β-phenylethyl and β-phenylpropyl; and cycloaliphatic hydrocarbon radicals, such as cyclopentyl, cyclohexyl and methylcyclohexyl. Examples of monovalent halohydrocarbon radicals are chloromethyl, β-chloropropyl, 3,3,3-trifluoropropyl, α,α,α-trifluorotolyl, chlorophenyl, bromoxenyl, trifluorovinyl and chlorocyclohexyl. R' can also be cyanoalkyl radicals, such as β-cyanoethyl, β-cyanopropyl, gamma-cyanopropyl or omega-cyanooctadecyl; and hydrogen atoms.

Examples of organosilanes (a) which are representative of the operable species include, phenyltrichlorosilane, diphenyldichlorosilane, phenylmethyldichlorosilane, methyltrichlorosilane, dimethyldichlorosilane, phenyltribromosilane, dimethyldiiodosilane, phenylmethyldibromosilane, ethyltrichlorosilane, ethylmethyldichlorosilane, dodecyltribromosilane, octadecyltrichlorosilane, methylvinyldichlorosilane, vinyltrichlorosilane, phenylvinyldichlorosilane, allyltrichlorosilane, chloromethyltrichlorosilane, 3,3,3 - trifluoropropyltrichlorosilane, 3,3,3 - trifluoropropylmethyldichlorosilane, propyltriiodosilane, trichlorosilane, monomethyldichlorosilane, phenylvinyldibromosilane, dichlorophenyltrichlorosilane, cyclohexyltrichlorosilane, $CH_2=C(CH_3)CH_2SiCl_3$, $$CH_2=CH-(CH_2)_4SiCl_3$$

tolyltrichlorosilane, xylyltrichlorosilane, naphthyltrichlorosilane, xenyltrichlorosilane, $C_6H_5CH_2SiCl_3$, $$C_6H_5CH_2CH_2SiCl_3$$

$C_6H_5CH_2CH(CH_3)SiCl_3$, cyclopentyltrichlorosilane, α,α,α-trifluorotolyltrichlorosilane, bromoxenyltrichlorosilane, β - cyanoethyltrichlorosilane, trifluorovinyltrichlorosilane and gamma-cyanopropyltrichlorosilane.

The silanes can be the same or mixed such as (a) can be a mixture of monophenyltrichlorosilane and phenylmethyldichlorosilane. The mixtures can be of two or more silanes.

The organosilicon compound (C) can also be a hydrocarbonoxy silicon compound (b) of the general unit formula $R'_x(OR'')_ySiO_{4-x-y/2}$ where R' is a monovalent hydrocarbon radical or a monovalent halohydrocarbon radical as defined above. The value of $x$ is as defined above and $y$ has an average value of from 0.10 to 3. The sum of $x+y$ does not exceed 4. The most preferred value of $y$ is from 1 to 3. The hydrocarbonoxy silicon compound (b) as defined above can be either a siloxane or a silane such as when $y$ has a value of 3. R'' is a monovalent hydrocarbon radical having from 1 to 6 carbon atoms. Examples of operable hydrocarbon radicals of R'' are methyl, ethyl, isopropyl, propyl, butyl, pentyl or hexyl. Any of the alkoxy groups are operative such as methoxy, ethoxy and butoxy. The hydrocarbonoxy silicon compounds of (b) can contain any of those organic groups as described for R' above for (a).

The organosilanes (a) and the hydrocarbonoxy silicon compounds (b) can also be used as a mixture (c) of these two components. Any ratio of the two components (a) and (b) is operative.

The ratio of the diorganopolysiloxane (A) and the organosilicon compound (C) can vary over a large range. The amount of the diorganopolysiloxane (A) can vary from 5 to 95 mole percent based on the total moles of (A) and (C) combined and the organosilicon compound (C) can also vary from 5 to 95 mole percent.

The reaction (III) must have present at least 40 weight percent based on the combined weight of (A) and (C) of organic solvent. The preferred amount of organic solvent is at least 50 weight percent based on the combined weight of (A) and (C). The organic solvents have been described above. The amounts required include the organic solvent (D) and any solvent that is added in (I). If desired, all the solvent can be added with (C) or part can be added with (C) and the remainder with the mixture from (I). If less than 40 weight percent of organic solvent is present a useable block copolymer will not be produced by this method.

The organosilicon compound solution from (II) is added to the dispersion formed in (I). The order of addition at this point in the present method is critcial, the resulting solution of (II) must be added to the dispersion formed in (I). The rate of addition is not critical, but the solution of (II) should not be added all at one time to get the best results. The addition is preferably conducted such that at no time are there large excesses of unreacted organosilicon compound (C). The reaction, which is a hydrolysis, is usually very rapid and the addition can be conducted very rapidly. The dispersion is continually agitated throughout the addition to maintain a dispersion and thereafter until the reaction is complete. The reaction (III) is believed to be a rapid hydrolysis-reaction followed by a condensation reaction. The length of time the dispersion is agitated is not critical once the reaction is complete. The temperature of the reaction occurring in (III) is not critical and can vary from room temperature to the reflux temperature of the system. The reaction (III) is exothermic when halosilanes are used and can be externally cooled if desired. No advantages are seen in either heating or cooling the reaction (III) especially when halosilanes are used. When hydrocarbonoxy silicon compounds (b) are used, heating can aid in shortening the reaction time.

Reaction (III) requires the presence of a catalytic quantity of an acid catalyst which is not a siloxane bond rearranging catalyst. When the halosilanes (a) are used, the amount of water used in (B) is sufficient to give an aqueous hydrogen halide concentration of from 1 to 20 weight percent based on the weight of the water. The most preferred hydrogen halide concentration is from 5 to 15 weight percent based on the water content. The hydrogen halide in the above situation comes from the hydrolysis of the halosilanes (a) and the halogen-containing diorganopolysiloxanes (A) when the solution from (II) is added to the dispersion from (I). When the hydrogen halide concentration is below one weight percent, reaction (III) does not go to completion and when the hydrogen halide concentration is greater than 20 weight percent, the hydrogen halide becomes a siloxane bond rearranging catalyst and the block copolymer structure is damaged. Under certain circumstances the amount of water necessary to form a dispersion is great enough so that the concentration of hydrogen halide falls below one weight percent. In this case hydrogen halide can be added to bring the concentration up to the operable range.

When the hydrocarbonoxy silicon compounds (b) are used, the amount of an organic acid catalyst which is not a siloxane bond rearranging catalyst is at least 0.05 weight percent based on the weight of the hydrocarbonoxy silicon compound (b). Examples of the organic acid catalyst are such catalysts as sulfonic acids such as para-toluenesulfonic acid, benzenesulfonic acid, hexafluoropropylsulfonic acid; and acetic acid. Each of the above organic acid catalyst can be siloxane-bond rearranging catalyst if the concentrations are too high. Because the level of concentration at which the organic acid catalysts will become siloxane-bond rearranging catalyst varies, the organic acid catalysts are usually not used in concentrations greater than 1.0 weight percent based on the weight of the hydrocarbonoxy silicon compound (b). Higher concentrations can be used and are operative as long as the organic acid catalyst does not become a siloxane-bond rearranging catalyst. The concentration at which the organic acid catalyst becomes a siloxane-bond rearranging catalyst will vary with each organic acid catalyst, with temperature, with reactants and with time. The upper limit of organic acid catalyst is therefore indefinable and must be calculated for each set of reaction conditions.

When the hydrocarbonoxy silicon compounds (b) are used, the amount of mineral acid catalyst which is not a siloxane-bond rearranging catalyst is from 1 to 20 weight percent based on the weight of the water. Examples of mineral acids are hydrogen chloride, sulfuric acid, phosphoric acid, hydrogen bromide and nitric acid. The mineral acids can be added with the water (B) or they can be added to the dispersion of (I) just prior to the addition of the solution of (II) to the dispersion of (I). The mineral acids will become siloxane-bond rearranging catalyst when the concentration of the acid reaches a certain concentration. Each mineral acid will vary as to the concentration above which they will become siloxane-bond rearranging catalyst, therefore, if this concentration is not known care should be used in using the mineral acids. The hydrogen halides can be used between 1 to 20 weight percent based on the weight of the water. The other mineral acids should be used in amounts of no more than 10 weight percent based on the water concentration unless, the experimental conditions are thoroughly checked to determine if significant siloxane-bond rearrangement is taking place. Besides the concentration of the mineral acids, the temperature of reaction (III) and the time required for reaction and the reactants all will produce wide variations in the level of the particular mineral acid which will be great enough to cause significant siloxane-bond rearrangement.

When the organosilicon compound (C) is a mixture of halosilanes (a) and hydrocarbonoxy silicon compounds (b) the catalytic quantity of an acid catalyst which is not a siloxane-bond rearranging catalyst, said acid catalyst is selected from the group consisting of (3) from 1 to 20 weight percent based on the weight of the water of a hydrogen halide (4) from a trace amount to 20 weight percent based on the weight of the water of a hydrogen halide and at least a trace amount of an organic acid catalyst (5) from a trace amount to 20 weight percent based on the weight of the water of a hydrogen halide and at least a trace amount of a mineral acid selected from the group consisting of sulfuric acid, phosphoric acid, and nitric acid (6) from a trace amount to 20 weight percent based on the weight of the water of a hydrogen halide, at least a trace amount of an organic acid catalyst and at least a trace amount of a mineral acid selected from the group consisting of sulfuric acid, phosphoric acid and nitric acid. When both the halosilanes and the hydrocarbonoxy silicon compounds are used, there is always present an amount of hydrogen halide in reaction (III). The amount of hydrogen halide can be very small and thus can be present in trace amounts, as there is no restriction on the ratio of halosilane (a) to hydrocarbonoxy silicon compound (b). The hydrogen halide is formed from the hydrolysis of the halosilanes and can also be added to the reaction mixture before the addition of the organosilicon solution of (II) to the dispersion of (I). There is no practical advantages in using acids other than halogen acids when a mixture of (a) and (b) is used, but other combinations such as described above are not outside the scope of the present invention.

After the reaction is complete in (III) the aqueous phase-containing some by-products such as hydrogen halide or other catalyst or alcohol is allowed to separate from the organopolysiloxane phase-containing the block copolymer. After removing the aqueous phase by conventional means such as decanting or using a separatory funnel, the residual acid and water are removed from the organopolysiloxane phase. The residual acid and water can be removed by any conventional means. If the acid catalyst is volatile it is preferred to azeotrope the acid and water over by refluxing the organic phase. If the acid catalyst used is not volatile, some other method for removing the acid and water is required. Other methods to remove the acid catalyst can be by washing with water and then azeotroping the remaining water, crystallization of the acid catalyst and filtration, application of an acid acceptor which can then be removed from the organopolysiloxane phase such as sodium sulfate. The added steps required to remove the residual acid catalyst when acids other than volatile acids are used add to the cost of producing the product and do not have any advantages to make the added cost acceptable. The preferred catalysts therefore are hydrogen halides.

The organosilicon block copolymer does not require further processing to be a useful product. The solution of the organosilicon block copolymer can be used in paints, lacquers, varnishes, coatings for electrical equipment, and any place a solution can be used in formulations and in applying a film.

To produce organosilicon block copolymers having utility at 100 weight percent solids, the organic solution of the organosilicon block copolymer can be further processed. The properties of the final organosilicon block copolymer can be improved in certain cases by bodying. The organic phase (solution) from step (V) can be bodied by either heating alone, by heating in the presence of a condensation catalyst, or by just mixing with a condensation catalyst. The condensation catalysts are typical silanol condensation catalysts such as zinc octoate, potassium acetate and toluene sulfonic acid. Also conventional basic condensation catalysts can be used such as, for example, $NH_4OH$ and $Na_2CO_3$. The condensation catalyst cannot be a siloxane-bond rearrangement catalyst. The bodying step should be conducted at such solids concentration and catalyst concentration so as not to gel the product or to cause siloxane-bond rearrangement. When condensation catalysts are used the concentration of the catalysts can vary from 0.001 weight percent based on the weight of the block copolymer for highly active catalyst to 5 weight percent for relatively slow catalyst. For bodying the organosilicon block copolymer of this invention heat can be used alone. The length of time for bodying can be shortened by using from 0.01 to 1.5 weight percent zinc octoate based on the weight of the block copolymer, which is the preferred method. The length of time of bodying varies depending on the catalyst used, the bodying conditions and the desired properties. When heat alone is used for bodying, the time may be as long as several hours, whereas, when heating with condensation salts such as zinc octoate the time may be shortened to a few hours. When basic condensation catalysts are used and no heating is employed the time may be a few hours to only a few minutes or with slight heating only a few minutes. Care at all times should be employed when using basic condensation catalyst to avoid siloxane-bond rearranging conditions.

After the block copolymer is bodied which is usually accompanied by a reduction of the hydroxyl content of the block copolymer and with the formation of small amounts of water, the block copolymer can easily be concentrated to 100 weight percent solids to provide a useful material which can be used for coating powders, molding compounds, laminating compounds and rubbery products. The concentration can be accomplished by any conventional method such as vacuum stripping of the solvent, spray drying, or by using a drum drier.

The organopolysiloxane block copolymers of the present invention can be cured by any conventional curing catalyst such as iron octoate, iron naphthate, copper naphthanate, cerium naphthanate, tetramethyl guanadine octoate. Curing catalyst which can catalyze siloxane-bond rearrangement should be avoided as the unique structure of the block copolymer can be damaged causing the properties to deteriorate. Heat alone is sometimes sufficient to cure the block copolymers of the present invention.

The present invention has several advantages over earlier methods for producing organosilicon block copolymers as produced by this invention. An earlier method such as the method used in copending U.S. patent application Serial No. 268,545, filed March 28, 1963, now abandoned of which U.S. patent application Serial No. 361,258, filed April 20, 1964, is a continuation-in-part, in which a coupling step between a hydroxyl-containing dimethylpolysiloxane and a chlorosilane is required. The present invention eliminates the coupling step and also has the added advantage of using halogen terminated diorganopolysiloxanes and alkoxy terminated diorganopolysiloxanes which are less expensive than the hydroxyl terminated diorganopolysiloxanes as the hydroxyl terminated diorganopolysiloxanes are produced from the chlorine terminated diorganopolysiloxanes. The elimination of the coupling step also makes the method less expensive as the number of steps are reduced and the need for essentially anhydrous conditions is eliminated and the acid acceptor which is usually used is also eliminated. The need for neutralization steps and washing steps also are eliminated, thus, the overall method is less expensive and therefore more desirable than the earlier method without consideration of the improved products obtainable.

The products from the present invention can be made with consistent properties and wider ranges of starting reactants can be used without altering the method. The method of this invention is practical, economical and produces acceptable products consistently.

The following examples are illustrative only and should not be construed as limiting the invention which is properly delineated in the appended claims.

*Example 1*

A dispersion was formed by mixing in a three-necked flask equipped with a thermometer and an agitator 222 g. of hydroxylated essentially dimethylpolysiloxane having an average of 39 silicon atoms per molecule, 360 g. of toluene and 1900 g. of water, and enough agitation was applied to form a dispersion consisting of two phases, an essentially aqueous phase and an essentially diorganopolysiloxane phase. In a quart container, 381 g. (1.8 moles) of phenyltrichlorosilane, 38 g. (0.2 mole) of phenylmethyldichlorosilane and 360 g. of toluene was mixed and then added to the above dispersion over a two minute period, there being sufficient agitation to maintain the dispersion. The temperature increased from 20 to 55° C. during the addition. The by-produced hydrogen chloride formed on the addition gave a 10 weight percent hydrogen chloride solution in water. The dispersion was stirred for 30 minutes after the addition. The aqueous phase was separated from the organopolysiloxane phase consisting of a block copolymer and toluene by decanting. The organopolysiloxane phase was washed once with water and then azeotroped until the temperature reached 116° C. at which time the solution had a solids content of 46.9 weight percent. A film of the block copolymer was tough and flexible and had a 2.8 percent weight loss after heating at 250° C. for three hours. The block copolymer was cured to tough films with either 0.1 weight percent based on the weight of the block copolymer of iron octoate, or 0.15 weight percent based on the weight of the block copolymer of tetramethylguanidine octoate. The solvent was removed by vacuum stripping to 155° C. The product was of low viscosity at 155° C. but a solid at room temperature.

*Example 2*

An organopolysiloxane block copolymer was prepared according to Example 1. The product was divided in three portions.

(A) 693 g. of a solution containing 300 g. of solids of the above block copolymer was bodied with 3.75 g. of zinc octoate (8% active zinc) which is 0.1 weight percent active zinc based on the weight of the block copolymer by refluxing for 6.5 hours. The bodied block copolymer was vacuum stripped to 155° C. At 155° C. the block copolymer had a viscosity higher than the unbodied block copolymer under the same conditions. The product had a 1.6 percent weight loss after heating 3 hours at 250° C. When drum dried the block copolymer could be used to form a good coating powder.

(B) 260 g. of solids of the above copolymer in a toluene solution at 43.3 percent solids was bodied with 1.63 g. of zinc octoate (8% active zinc) which is 0.05 weight percent active zinc based on the weight of the block copolymer by refluxing at 114° C. for 14 hours. A very viscous product resulted but was soluble and formed a tough, flexible film having a 1.9 percent weight loss after heating for 3 hours at 250° C.

(C) 693 g. of a toluene solution containing 300 g. of solids of the above block copolymer was bodied at 119° C. for 13.5 hours without any added bodying catalyst. The block copolymer had a higher viscosity than the unbodied block copolymer and had a 2.0 percent weight loss after heating for 3 hours at 250° C.

(D) When a solution of the above copolymer is bodied by mixing with ammonium hydroxide at room temperature, equivalent results are obtained, the ammonium hydroxide being removed by heating.

*Example 3*

A block copolymer was prepared by essentially the same procedure as Example 1 and with the reactants of Example 1. The addition of the chlorosilane solution to the dispersion required 3 minutes and the temperature increased to 90° C. The agitation was maintained for 30 minutes after the addition while the temperature was held between 70° to 90° C. The product was equivalent to that of Example 1.

*Example 4*

(A) A dispersion was formed as in Example 1 from 222 g. (3.0 moles) of hydroxylated essentially dimethylpolysiloxane having an average of 54 silicon atoms per molecule, 360 g. of toluene and 1900 g. of water. The chlorosilane solution was the same as Example 1. The same procedure as Example 1 was used except the temperature after the addition was held between 53° to 60° C. The block copolymer formed had a 2.3 percent weight loss after 3 hours at 250° C. and a Durrans melting point of 83° C. when the solvent was removed by vacuum stripping to 150° C. The block copolymer was a clear resinous product.

After bodying 305 g. of solids of the block copolymer at 40 percent solids in toluene with 1.91 g. of zinc octoate (8% active zinc) which is 0.05 weight percent active zinc based on the weight of the block copolymer for 7 hours at 114° C. and then vacuum stripping to 150° C., the block copolymer had a 1.7 percent weight loss after heating for 3 hours at 250° C. and a Durrans melting point of 96° C.

(B) A clear resinous block copolymer was prepared by the procedure of (A) above and the reactants were the same except that the hydroxylated essentially dimethylpolysiloxane had an average of 26 silicon atoms per molecule. The block copolymer had a 2.7 percent weight loss after 3 hours at 150° C. and a 49.1 percent solids toluene solution had a viscosity of 12 centistokes at 250° C.

(C) A block copolymer was prepared by the procedure of (A) above using the same reactants except that the hydroxylated essentially dimethylpolysiloxane had an average of 78 silicon atoms per molecule. The block copolymer had a Durrans melting point of 88° C.

(D) A block copolymer was prepared by the procedure of (A) above using the same reactants except that the hydroxylated essentially dimethylpolysiloxane had an average of 104 silicon atoms per molecule. The block copolymer was a uniform, soft, flexible material.

(E) A block copolymer was prepared by the procedure of (A) above, the reactants were 56 g. (0.75 mole) of a hydroxylated essentially dimethylpolysiloxane having an average of 168 silicon atoms per molecule, 333 g. (1.574 moles) of phenyltrichlorosilane, 33 g. (0.173 mole) of phenylmethyldichlorosilane, 424 g. of toluene and 1656 g. of water. The block copolymer had a melting point of 150° C. and a 2.8 percent weight loss after 3 hours at 250° C. The block copolymer was hazy.

*Example 5*

A block copolymer was prepared by the same procedure as Example 1, except the addition of the chlorosilane solution to the dispersion was over a 24 minute period. The reactants used were 93 g. (1.25 moles) of the dimethylpolysiloxane of Example 4(A), 238 g. (1.13 moles) of phenyltrichlorosilane, 24 g. (0.12 mole) of phenylmethyldichlorosilane, 284 g. of toluene and 1100 g. of water. The block copolymer was rubbery and almost clear after bodying for 8 hours with 0.1 weight percent p-toluene sulfonic acid based on the total weight of the block copolymer. A block copolymer film had a 1.6 percent weight loss after heating for 3 hours at 250° C. and a block copolymer solution, a viscosity of 4.7 centistokes at 25° C. at 29.7 percent solids.

*Example 6*

(A) A block copolymer was prepared according to the procedure of Example 1. The ingredients were 259 g. (3.50 moles) of a hydroxylated essentially dimethylpolysiloxane having an average of 56 silicon atoms per molecule, 285 g. (1.35 moles) of phenyltrichlorosilane, 29 g. (0.152 mole) of phenylmethyldichlorosilane, 680 g. of toluene and 1430 g. of water. The block copolymer was a clear film-forming material with a 2.8 percent weight loss after 3 hours at 250° C.

(B) A block copolymer was prepared by the procedure of Example 1 except that the addition time for the chlorosilane solution to the dispersion was 11 minutes and the temperature increased to 64° C. The ingredients were 93 g. (1.25 moles) of hydroxylated essentially dimethylpolysiloxane having an average of 104 silicon atoms per molecule, 238 g. (1.13 moles) of phenyltrichlorosilane 24 g. (0.12 mole) of phenylmethyldichlorosilane, 384 g. of toulene and 1100 g. of water. The block copolymer was a transparent solid after vacuum stripping to 160° C. and had a 2.6 percent weight loss after 45 hours at 250° C.

(C) A rubbery block copolymer with a 4.2 percent weight loss after 45 hours at 250° C. was prepared by the procedure of Example 1, except the addition time for the chlorosilane solution to the dispersion was 6 minutes. The ingredients were 148 g. (2.00 moles) of the dimethylpolysiloxane of (B) above, 95 g. (0.45 mole) of phenyltrichlorosilane, 9.5 g. (0.05 mole) of phenylmethyldichlorosilane, 320 g. of toluene and 477 g. of water.

(D) A block copolymer was prepared by the procedure of Example 1, except the addition time of the chlorosilane solution to the dispersion was 30 minutes, the temperature increased to 81° C. during the addition and after the addition the dispersion was agitated for 30 minutes at 70° to 80° C. The resinous block copolymer was prepared from 74 g. (1.0 mole) of the dimethylpolysiloxane of Example 1, 187 g. (1.25 moles) of methyltrichlorosilane, 370 g. (1.75 moles) of phenyltrichlorosilane, 253 g. (1.0 mole) of diphenyldichlorosilane, 874 g. of toluene and 3600 g. of water. After bodying for 8.5 hours with 2.5 g. of zinc octoate (8% active zinc) which is 0.1 weight percent based on the weight of the block copolymer, the hazy product had a 3.3 percent weight loss after 3 hours at 250° C.

(E) A resinous block copolymer having a 2.1 percent weight loss after 3 hours at 250° C. was prepared by the procedure of Example 1, except the addition time for the silane solution to the dispersion was 10 minutes and the temperature increased to 65° C. during the addition. The ingredients were 96 g. (1.3 moles) of the dimethylpolysiloxane of Example 1, 197 g. (1.45 moles) of methyltrimethoxysilane, 370 g. (1.75 moles) of phenyltrichlorosilane, 96 g. (0.5 mole) of phenylmethyldichlorosilane, 732 g. of toluene and 1728 g. of water.

(F) A resinous block copolymer was prepared by the procedure of Example 1, except the temperature increased to 71° C. during the addition of the chlorosilane solution to the dispersion. The ingredients were 64 g. (0.87 mole) of the dimethylpolysiloxane of Example 1, 212 g. (1.0 mole) of phenyltrichlorosilane, 160 g. (0.63 mole) of diphenyldichlorosilane, 478 g. of toluene and 1400 g. of water.

(G) A resinous block copolymer having a 1.8 percent weight loss after 3 hours at 250° C. and a laminating resin was prepared by forming a dispersion of 19 g. (0.25 mole) of the dimethylpolysiloxane of Example 4, 486 g. of toluene and 2273 g. of water by agitating until the phases were evenly dispersed. One-half of the solution of 950 g. (4.5 moles) of phenyltrichlorosilane, 63 g. (0.25 mole) of diphenyldichlorosilane and 486 g. of toluene was added to the dispersion over a 5 minute period during which the temperature increased from 23 to 61° C. About two-thirds of the water was removed by allowing the phases to separate, the remaining water was again dispersed by agitation and 2272 g. of water was added. To this dispersion the remaining one-half of the chlorosilane solution was added over a 4 minute period during which the temperature increased from 38° to 70° C. The dispersion was agitated for 21 minutes after the last addition. The dispersion was allowed to separate into an aqueous phase and an organopolysiloxane phase. The phases were separated and the organopolysiloxane phase was washed three times with a sodium chloride-water solution. The organopolysiloxane phase was then azeotroped to remove the residual water and hydrogen chloride and then concentrated slightly be removing toluene up to 115° C.

(H) A resinous block copolymer having a 2.7 percent weight loss after 3 hours at 250° C. and when vacuum stripped to 159° C. was a clear, brittle product which softened at 150° C. was prepared by the procedure of (G) above. The ingredients were 56 g. (0.75 mole) of the dimethylpolysiloxane of Example 4, 846 g. (4.0 moles) of phenyltrichlorosilane, 63 g. (0.25 mole) of diphenyldichlorosilane, 930 g. of toluene and 4100 g. of water.

*Example 7*

(A) A dispersion was prepared by agitating 228 g. (3.0 moles) of chlorine endblocked essentially dimethylpolysiloxane having an average of 34 silicon atoms per molecule with 360 g. of toluene and 2100 g. of water for 15 minutes at 5° to 8° C. A solution of 381 g. (1.8 moles) of phenyltrichlorosilane, 38 g. (0.2 mole) of phenylmethyldichlorosilane and 360 g. of toluene was prepared by mixing and this solution was added to the dispersion over a 3 minute period during which time the temperature increased from 18° to 52° C. The dispersion was then further agitated for 30 minutes at 48° to 52° C. The dispersion was then allowed to separate into an aqueous phase which was discarded and an organopolysiloxane phase which was washed two times with a sodium chloride-water solution. The organopolysiloxane phase was then vacuum stripped to 150° C. and the solid block copolymer formed was a clear slightly blue product which has a 1.8 percent weight loss after 3 hours at 250° C. and which is a good coating powder. The above block copolymer formed an equivalent product when washed with a sodium carbonate-water solution after the two washes with a sodium-chloride-water solution and followed by 3 washes of a sodium chloride-water solution.

(B) A block copolymer was prepared by the procedure of (A) above, except that pyridine was added to the water as an acid acceptor. The ingredients were 208 g. (2.75 moles) of chlorine-endblocked essentially dimethylpolysiloxane having an average of 42 silicon atoms per molecule, 427 g. (2.02 moles) of phenyltrichlorosilane, 44 g. (0.23 mole) of phenylmethyldichlorosilane, 14 g. of pyridine, 744 g. of toluene and 2000 g. of water The resinous block copolymer had a 2.2 percent weight loss after 3 hours at 250° C. and was a clear, hard, slightly bluish product after vacuum stripping to 150° C.

(C) A block copolymer was prepared with the same procedure and the same formulation as (B) above, except that the dimethylpolysiloxane had an average of 35 silicon atoms per molecule. The resinous block copolymer had a 2.0 percent weight loss after 3 hours at 250° C. and a Durrans melting point of 125° C.

*Example 8*

A dispersion was prepared from 111 g. (1.5 moles) of a hydroxylated essentially dimethylpolysiloxane having an average of 39 silicon atoms per molecule, 950 g. of water and 90 g. of toluene by agitating until the dispersion forms. A solution of 19 g. (0.1 mole) of phenylmethyldichlorosilane, 90 g. of toluene and 20 g. of pyridine was added to the dispersion and agitated for 30 minutes. A solution of 190 g. (0.9 mole) of phenyltrichlorosilane and 180 g. of toluene was added to the dispersion during which the temperature increased from 32° to 60° C. The dispersion was then agitated for 30 minutes at 53° to 60° C. The dispersion was allowed to separate into an aqueous phase which was discarded after being separated from an organopolysiloxane phase which was washed once with a sodium chloride-water solution. The washed organopolysiloxane phase was vacuum stripped to 160° C. producing a clear, slightly blue product which had a 3.4 percent weight loss after 3 hours at 250° C.

*Example 9*

A resinous block copolymer having a 1.7 percent weight loss after 3 hours at 250° C. was prepared by the procedure of Example 1 and with the same formulation as Example 1 except that the diorganopolysiloxane was a chlorine-endblocked essentially dimethylpolysiloxane having an average of 75 silicon atoms per molecule, the dimethylpolysiloxane was dispersed in the water along with the toluene as in Example 1 and was agitated for 5 minutes.

*Example 10*

When 873 g. (9.5 moles) of a chlorine-endblocked diorganopolysiloxane composed of molecules having an average of 9 dimethylsiloxane units per molecule and one diphenylsiloxane unit per molecule is dispersed in 765 g. of water providing a 20 weight percent based on the weight of the water of hydrogen chloride and hydrogen bromide solution by agitating a dispersion is formed. A solution of 172 g. (0.5 mole) of phenyltribromosilane in 580 g. of xylene is added to the above dispersion over a 35 minute period. The aqueous and organopolysiloxane phases are separated. The organopolysiloxane phase is azeotroped to remove the residual water and hydrogen halide. The block copolymer produced is equivalent to the product of Example 6(H).

*Example 11*

Block copolymers are formed when the following essentially diorganopolysiloxane is substituted for the hydroxylated dimethylpolysiloxane of Example 1 in the same mole ratio.

(A) A chlorine-endblocked dimethylpolysiloxane having an average of 7 silicon atoms per molecule.

(B) A hydroxylated essentially diorganopolysiloxane being composed of 75 mole percent phenylmethylsiloxane units and 20 mole percent dimethylsiloxane units and 5 mole percent of monomethylsiloxane units and having an average of 95 silicon atoms per molecule.

(C) A chlorine-endblocked phenylmethylpolysiloxane having an average of 28 silicon atoms per molecule.

(D) A bromide-endblocked diorganopolysiloxane composed of 55 mole percent of dimethylpolysiloxane units, 40 mole percent diphenylsiloxane units and 5 mole percent of methylvinylsiloxane units, and having an average of 40 silicon atoms per molecule.

(E) A methoxy-endblocked diorganopolysiloxane being composed of 50 mole percent phenylmethylsiloxane units and 50 mole percent diethylsiloxane units and having an average of 180 silicon atoms per molecule.

(F) A chlorine-endblocked diorganopolysiloxane being composed of 70 mole percent dimethylsiloxane units, 20 mole percent phenylvinylsiloxane units and 10 mole percent of phenylethylsiloxane units and having an average of 68 silicon atoms per molecule.

(G) A hydroxylated essentially diorganopolysiloxane being composed of 90 mole percent dimethylsiloxane units and 10 mole percent monophenylsiloxane units and having an average of 80 silicon atoms per molecule.

*Example 12*

Block copolymers are formed when the following silanes are substituted for the phenyltrichlorosilane and phenylmethyldichlorosilane of Example 1 in the same mole ratio.

(A) Octadecyltrichlorosilane.

(B) A mixture of ethyltrichlorosilane and ethylmethyldichlorosilane in a mole ratio of 1.0 mole to 0.2 mole respectively.

(C) $C_6H_5CH_2CH_2SiCl_3$.

(D) A mixture of xenyltrichlorosilane and methylvinyldichlorosilane in a mole ratio of 1.0 to 0.1 respectively.

(E) A mixture of vinyltrichlorosilane and dichlorophenyldichlorosilane in a mole ratio of 5 to 4.

(F) Cyclopentyltrichlorosilane.

(G) β-Cyanoethyltrichlorosilane.

(H) 3,3,3-trifluoropropyltrichlorosilane.

(I) Naphthyltrichlorosilane.

(J) A mixture of phenyltrichlorosilane, bromoxenyltrichlorosilane and (β-phenylethyl)methyldichlorosilane in a mole ratio of 1.0 to 0.2 to 0.1.

*Example 13*

When 518 g. (7.0 moles) of a hydroxyl-endblocked dimethylpolysiloxane having an average of 45 silicon atoms per molecule and 30 g. of perchloroethylene is dispersed in 7330 g. of water providing a 15 weight percent water solution of hydrogen iodide by agitating and when a solution of 1174 g. (2.6 moles) of propyltriiodosilane and 125 g. (0.4 mole) of dimethyldiiodosilane in 785 g. of perchloroethylene is added to the above dispersion and when the procedure of Example 1 is followed, a block copolymer is formed.

*Example 14*

When 444 g. (6.0 moles) of a hydroxyl-endblocked dimethylpolysiloxane having an average of 35 silicon atoms per molecule and 100 g. of dibutyl ether is dispersed in 300 g. of water to which is added 0.8 g. of p-toluene sulfonic acid by agitating and when a solution of 792 g. (4.0 moles) phenyltrimethoxysilane and 2140 g. of dibutyl ether is added to the above dispersion and when the dispersion is heated to 70° C. and agitated for 1 hour and when the procedure of Example 1 is followed, a block copolymer is formed.

Example 15

When 370 g. (5.0 moles) of a hydroxyl-endblocked dimethylpolysiloxane having an average of 62 silicon atoms per molecule and 1900 g. of chlorobenzene is dispersed in 750 g. of water in which 11.25 g. of sulfuric acid is added providing a 1.5 weight percent water solution of sulfuric acid by agitating and when a solution of 572 g. (5.0 moles) a methoxylated polysiloxane being composed of 60 mole percent monophenylsiloxane units and 40 mole percent of monoethylsiloxane units and having 0.2 methoxy radicals per silicon atom and 1773 g. of chlorobenzene is added to the above dispersion and when the dispersion is heated to 60° C. for 45 minutes with agitation and when the procedure of Example 1 is followed, a block copolymer is formed.

Example 16

When the following ingredients are used in the procedure of Example 1, an equivalent block polymer is formed:

(A) 222 g. (3.0 moles) of a hydroxylated essentially dimethyl polysiloxane having an average of 39 silicon atoms per molecule, 720 g. of toluene, 381 g. (1.8 moles) of phenylmethyldichlorosilane, and 10,580 g. of water.

(B) 222 g. (3.0 moles) of a hydroxylated essentially dimethyl polysiloxane having an average of 39 silicon atoms per molecule, 720 g. of toluene, 356 g. (1.8 moles) of phenyltrimethoxysilane, 38 g. (0.2 mole) of phenylmethyldichlorosilane, 1900 g. of water and 4.6 g. of hydrogen chloride.

(C) 222 g. (3.0 moles) of a hydroxylated essentially dimethyl polysiloxane having an average of 39 silicon atoms per molecule, 720 g. of toluene, 583 g. (1.8 moles) of phenyltributoxysilane, 53 g. (0.2 mole) of phenylmethyldibutoxysilane, 1800 g. of water and 0.6 g. (0.1 weight percent based on the weight of the butoxysilanes) of hexafluoropropylsulfonic acid, said sulfonic acid being added to the water.

(D) 222 g. (3.0 moles) of a hydroxylated essentially dimethyl polysiloxane having an average of 39 silicon atoms per molecule, 720 g. of toluene, 432 g. (1.8 moles) of phenyltriethoxysilane, 42 g. (0.2 mole) of phenylmethyldiethoxysilane, 1000 g. of water and 47.4 g. which is 10 weight percent based on the ethoxysilanes of acetic acid added to the water.

(E) 222 g. (3.0 moles) of a hydroxylated essentially dimethyl polysiloxane having an average of 39 silicon atoms per molecule, 780 g. of toluene, 356 g. (1.8 mole) of phenyltrimethoxysilane, 36 g. (0.2 mole) of phenylmethyldimethoxysilane, 1900 g. of water, 5 g. of hydrogen chloride, 0.2 g. of benzene sulfonic acid, and 0.3 g. of phosphoric acid, said acids being added to the water.

That which is claimed is:

1. The method of preparing an organosilicon block copolymer comprising mixing a hydroxyl-endblocked dimethylpolysiloxane having an average of from 5 to 180 silicon atoms per molecule with from 30 to 70 weight percent based on the weight of the dimethylpolysiloxane of toluene to form a solution which is added to enough water to provide a hydrogen chloride concentration of from 5 to 15 weight percent based on the weight of the water, the resulting mixture being agitated for a sufficient length of time to form a dispersion consisting of an aqueous phase and an organopolysiloxane phase, there being added to said dispersion a solution of organosilanes of the general formula $R_xSiCl_{4-x}$ where R is a monovalent hydrocarbon radical and $x$ has an average value of from 1 to 1.3 in 30 to 70 weight percent based on the weight of the organosilane of toluene, after said addition of the organosilane solution to the dispersion there being sufficient agitation to maintain a dispersion, the agitation be maintained for sufficient time for completion of a hydrolysis and condensation reaction, the aqueous phase and the organopolysiloxane phase then being separated and the residual hydrogen chloride and water being removed from the organopolysiloxane phase.

2. The method of preparing an organosilicon block copolymer comprising mixing a chlorine-endblocked dimethyl polysiloxane having an average of from 5 to 180 silicon atoms per molecule with from 30 to 70 weight percent based on the weight of the dimethylpolysiloxane of toluene to form a solution which is added to enough water to provide a hydrogen chloride concentration from 5 to 15 weight percent based on the weight of the water, the resulting mixture being agitated for a sufficient length of time to form a dispersion consisting of an aqueous phase and an organopolysiloxane phase, there being added to said dispersion a solution of organosilanes of the general formula $R_xSiCl_{4-x}$ where R is a monovalent hydrocarbon radical and $x$ has an average value of from 1 to 1.3 in 30 to 70 weight percent based on the weight of the organosilane of toluene, after said addition of the organosilane solution to the dispersion there being sufficient agitation to maintain a dispersion, the agitation being maintained for sufficient time for completion of a hydrolysis and condensation reaction, the aqueous phase and the organopolysiloxane phase then being separated and the residual hydrogen chloride and water being removed from the organopolysiloxane phase.

3. The method of preparing an organosilicon block copolymer comprising (I) mixing with sufficient agitation to form a dispersion, (A) a diorganopolysiloxane of the general formula $$[(CH_3)_2SiO]_s[(C_6H_5)(CH_3)SiO]_t[(C_6H_5)_2SiO]_u[RSiO_{3/2}]_v[R_2SiO]_w$$

where
R is a monovalent radical selected from the group consisting of methyl, phenyl, ethyl and vinyl radicals, the average number of organo groups per silicon atom is from 1.9 to 2.0,
$s$ is an integer from 0 to 180,
$t$ is an integer from 0 to 180,
$u$ is an integer from 0 to 90,
$v$ is an integer from 0 to 18,
$w$ is an integer from 0 to 90,
the sum of $s+t+u+v+w$ has an average value from 5 to 180, the sum of $s+t$ is at least 50 mole percent of $$s+t+u+v+w$$

$v$ has a maximum value of 10 mole percent of $s+t+u+v+w$, there is at least two silicon-bonded functional radicals per molecule selected from the group consisting of halogen atoms, alkoxy radicals and hydroxyl radicals, with (B) enough water to form a dispersion consisting essentially of
(1) an aqueous phase, and
(2) an organopolysiloxane phase, (II) dissolving
(C) an organosilicon compound selected from the group consisting of
(a) an organosilane of the average general formula $$R'_xSiX_{4-x}$$

where
R' is a monovalent radical selected from the group consisting of hydrocarbon radicals, halohydrocarbon radicals, cyanohydrocarbon radicals and hydrogen atoms,
X is a halogen atom,
$x$ has an average value of from 1 to 1.4, (b) a hydrocarbonoxy silicon compound of the general unit formula $$R'_x(OR'')_y SiO_{4-x-y/2}$$

where
R' is a monovalent radical selected from the group consisting of hydrocarbon radicals, halohydrocarbon radicals, cyanohydrocarbon radicals and hydrogen atoms,
R'' is a monovalent hydrocarbon radical having from 1 to 6 carbon atoms,
x has an average value of from 1 to 1.4,
y has an average value of from 0.10 to 3,
the sum of x+y does not exceed 4, and
(c) mixtures of (a) and (b), in
(D) organic solvent to form a solution containing at least 40 weight percent of said solvent,
(III) adding the solution from (II) to the dispersion from (I) with sufficient agitation to maintain the dispersion, there being present with (A) and (C) enough organic solvent to give a concentration of at least 40 weight percent based on the weight of (A) and (C) of an organic solvent, there being present a catalytic quantity of an acid catalyst which is not a siloxane bond rearranging catalyst, and
(IV) separating the aqueous phase from the organopolysiloxane phase and removing the residual acid and water from the organopolysiloxane phase.

4. The method in accordance with claim 3 further characterized by
(V) bodying the organopolysiloxane phase in the presence of a condensation catalyst 5. The method in accordance with claim 4 further characterized by
(VI) concentrating the organosilicon block copolymer by removing the organic solvent.

6. The method of preparing an organosilicon block copolymer comprising
(I) mixing with sufficient agitation to form a dispersion,
(A) a diorganopolysiloxane of the general formula $$[(CH_3)_2SiO]_s[(C_6H_5)(CH_3)SiO]_t[(C_6H_5)_2SiO]_u[RSiO_{3/2}]_v[R_2SiO]_w$$

where
R is a monovalent radical selected from the group consisting of methyl, phenyl, ethyl and vinyl radicals, the average number of organo groups per silicon atom is from 1.9 to 2.0,
s is an integer from 0 to 180,
t is an integer from 0 to 180,
u is an integer from 0 to 90,
v is an integer from 0 to 18,
w is an integer from 0 to 90,
the sum of s+t+u+v+w is an average value from 5 to 180, the sum of s+t is at least 50 mole percent of s+t+u+v+w, v has a maximum of 10 mole percent of $$s+t+u+v+w$$

there is at least two silicon-bonded functional radicals per molecule selected from the group consisting of halogen atoms, alkoxy radicals and hydroxyl radicals, with
(B) enough water to form a dispersion consisting essentially of
(1) an aqueous phase and
(2) an organopolysiloxane phase,
(II) dissolving
(C) an organosilane of the average general formula $$R'_xSiX_{4-x}$$

where

R' is a monovalent radical selected from the group consisting of hydrocarbon radicals, halohydrocarbon radicals, cyanohydrocarbon radicals and hydrogen atoms,
X is a halogen atom,
x has an average value of from 1 to 1.4 in
(D) organic solvent to form a solution containing at least 40 weight percent of said solvent,
(III) adding the solution from (II) to the dispersion from (I) with sufficient agitation to maintain the dispersion, there being present with (A) and (C) sufficient organic solvent to give a concentration of at least 40 weight percent based on the weight of (A) and (C) of an organic solvent, there being present enough water in (B) to give an aqueous hydrogen halide concentration of from 1 to 20 weight percent based on the water content, and
(IV) separating the aqueous phase from the organic phase and removing the residual acid and water from the organopolysiloxane phase.

7. The method in accordance with claim 6 in which X is chlorine, said hydrogen halide is hydrogen chloride and there is present enough water in (B) to give an aqueous hydrogen chloride concentration of from 5 to 15 weight percent based on the weight of the water.

8. The method in accordance with claim 6 further characterized by
(V) bodying the organopolysiloxane phase in the presence of a condensation catalyst.

9. The method in accordance with claim 8 in which the condensation catalyst is heat.

10. The method in accordance with claim 8 in which the condensation catalyst is zinc octoate.

11. The method in accordance with claim 8 further characterized by
(VI) concentrating the organosilicon block copolymer by removing the organic solvent.

12. The method of preparing an organosilicon block copolymer comprising
(I) mixing with sufficient agitation to form a dispersion,
(A) a diorganopolysiloxane of the general formula $$[(CH_3)_2SiO]_s[(C_6H_5)(CH_3)SiO]_t[(C_6H_5)_2SiO]_u[RSiO_{3/2}]_v[R_2SiO]_w$$

where
R is a monovalent radical selected from the group consisting of methyl, phenyl, ethyl and vinyl radicals the average number of organo groups per silicon atom is from 1.9 to 2.0,
s is an integer from 0 to 180,
t is an integer from 0 to 180,
u is an integer from 0 to 90,
v is an integer from 0 to 18,
w is an integer from 0 to 90,
the sum of s+t+u+v+w is an average value from 5 to 180, the sum of s+t is at least 50 mole percent of s+t+u+v+w, v has a maximum value of 10 mole percent of s+t+u+v+w, there is at least two silicon-bonded functional radicals per molecule selected from the group consisting of halogen atoms, alkoxy radicals and hydroxyl radicals, with
(B) enough water to form a dispersion consisting essentially of
(1) an aqueous phase, and
(2) an organopolysiloxane phase,
(II) dissolving
(C) an organosilicon compound selected from the group consisting of
(a) an organosilane of the average general formula $$R'_xSiX_{4-x}$$

where
- R' is a monovalent radical selected from group consisting of hydrocarbon radicals, halohydrocarbon radicals, cyanohydrocarbon radicals and hydrogen atoms,
- X is a halogen atom,
- $x$ has an average value of from 1 to 1.4, (b) a hydrocarbonoxy silicon compound of general unit formula $$R'_x(OR'')_y SiO_{4-x-y/2}$$

where
- R' is a monovalent radical selected from group consisting of hydrocarbon radicals, halohydrocarbon radicals, cyanohydrocarbon radicals and hydrogen atoms,
- R'' is a monovalent hydrocarbon radical having from 1 to 6 carbon atoms,
- $x$ has an average value of from 1 to 1.4,
- $y$ has an average value of from 0.10 to 3,
- the sum of $x+y$ does not exceed 4, and (c) mixtures of (a) and (b), in (D) organic solvent to form a solution containing at least 40 weight percent of said solvent, (III) adding the solution from (II) to the dispersion from (I) with sufficient agitation to maintain the dispersion, there being present with (A) and (C) enough organic solvent to give a concentration of at least 40 weight percent based on the weight of (A) and (C) of an organic solvent; there being present a catalyst such that when an organosilane, (a), is used the amount of water used in (B) is sufficient to give an aqueous hydrogen halide concentration of from 1 to 20 weight percent based on the weight of the water; when a hydrocarbonoxy silicon compound organosiloxane, (b), is used, the amount of an organic acid catalyst which is not a siloxane bond rearranging catalyst is at least 0.05 weight percent based on the weight of the hydrocarbonoxy silicon compound, (b); when a hydrocarbonoxy silicon compound, (b), is used, the amount of mineral acid catalyst which is not a siloxane bond rearranging catalyst is from 1 to 20 weight percent based on the weight of the water; and when a mixture of (a) and (b), (c), is used, the catalytic quantity of an acid catalyst which is not a siloxane-bond rearranging catalyst is selected from the group consisting of (3) from 1 to 20 weight percent based on the weight of the water of a hydrogen halide, (4) from a trace amount to 20 weight percent based on the weight of water of a hydrogen halide and at least a trace amount of an organic acid catalyst, (5) from a trace amount to 20 weight percent based on the weight of the water of a hydrogen halide and at least a trace amount of a mineral acid selected from the group consisting of sulfuric acid, phosphoric acid and nitric acid, (6) from a trace amount to 20 weight percent based on the weight of the water of a hydrogen halide, at least a trace amount of an organic acid catalyst and at least a trace amount of a mineral acid selected from the group consisting of sulfuric acid, phosphoric acid and nitric acid, and (IV) separating the aqueous phase from the organopolysiloxane phase and removing the residual acid and water from the organopolysiloxane phase.

13. The method in accordance with claim 12 in which the organic solvent is toluene.

14. The method of preparing an organosilicon block copolymer comprising (I) mixing
(A) a diorganopolysiloxane of the general formula $$[(CH_3)_2 SiO]_s [(C_6H_5)(CH_3)SiO]_t [C_6H_5)_2 SiO]_u [RSiO_{3/2}]_v [R_2 SiO]_w$$

where
- R is a monovalent radical selected from the group consisting of methyl, phenyl, ethyl and vinyl radicals, the average number of organo groups per silicon atom is from 1.9 to 2.0,
- $s$ is an integer from 0 to 180,
- $t$ is an integer from 0 to 180,
- $u$ is an integer from 0 to 90,
- $v$ is an integer from 0 to 18,
- $w$ is an integer from 0 to 90,
- the sum of $s+t+u+v+w$ is an average value from 5 to 180, the sum of $s+t$ is at least 50 mole percent of $s+t+u+v+w$, $v$ has a maximum value of 10 mole percent of $s+t+u+v+w$, there is at least two silicon-bonded functional radicals per molecule selected from the group consisting of halogen atoms, alkoxy radicals and hydroxyl radicals, with (B) enough water to form a dispersion consisting essentially of
(1) an aqueous phase, and
(2) an organopolysiloxane phase, with sufficient agitation to form a dispersion, (II) dissolving
(C) an organosilicon compound selected from the group consisting of
(a) an organosilane of the average general formula $$R'_x SiX_{4-x}$$

where
- R' is a monovalent radical selected from the group consisting of hydrocarbon radicals, halohydrocarbon radicals, cyanohydrocarbon radicals and hydrogen atoms,
- X is a halogen atom,
- $x$ has an average value of from 1 to 1.4, (b) a hydrocarbonoxy silicon compound of the general unit formula $$R'_x(OR'')_y SiO_{4-x-y/2}$$

where
- R' is a monovalent radical selected from group consisting of hydrocarbon radicals, halohydrocarbon radicals, cyanohydrocarbon radicals and hydrogen atoms,
- R'' is a monovalent hydrocarbon radical having from 1 to 6 carbon atoms,
- $x$ has an average value of from 1 to 1.4,
- $y$ has an average value of from 0.10 to 3,
- the sum of $x+y$ does not exceed 4, and (c) mixtures of (a) and (b), in (D) organic solvent to form a solution containing at least 40 weight percent of said solvent, (III) adding the solution from (II) to the dispersion from (1) with sufficient agitation to maintain the dispersion, there being present with (A) and (C) enough organic solvent to give a concentration of at least 40 weight percent based on the weight of (A) and (C) of an organic solvent, a hydrolysis and condensation reaction resulting from said addition being catalyzed by there being present in (B) enough water to give a hydrogen halide concentration of from 1 to 20 weight percent based on the weight of the water, there being present at least 0.05 weight percent based on the weight of (C) of an organic acid which is not a siloxane bond rearranging catalyst, there being present from 1 to 20 weight percent based on the weight of the water of a mineral acid which is not a siloxane bond rearranging catalyst selected from the group consisting of sulfuric acid, phosphoric acid and nitric acid or there being present from at least a trace amount to 20 weight percent based on the weight of the water of a hydrogen halide and a catalyst which is not a siloxane bond rearranging catalyst selected from the group consisting of at least a trace amount of an organic acid, at least a trace amount of a mineral acid selected from the group consisting of sulfuric acid, phosphoric acid and nitric acid, and at least a trace amount of an organic acid and at least a trace amount of a mineral acid selected from the group consisting of sulfuric acid, phosphoric acid and nitric acid, and (IV) separating the aqueous phase from the organopolysiloxane phase and removing the residual acid and water from the organopolysiloxane phase.

References Cited by the Examiner

UNITED STATES PATENTS

| | | | |
|---|---|---|---|
| 2,917,480 | 12/1959 | Bailey et al. | 260—825 |
| 3,105,061 | 9/1963 | Bruner | 260—46.5 |
| 3,127,363 | 3/1964 | Nitzche et al. | 260—18 |
| 3,202,634 | 8/1965 | Merker | 260—46.5 |
| 3,205,283 | 9/1965 | Modic | 260—825 |
| 3,225,419 | 12/1965 | Milton et al. | 29—132 |

FOREIGN PATENTS 519,188  12/1955  Canada.

LEON J. BERCOVITZ, *Primary Examiner.*

DONALD E. CZAJA, *Examiner.*

F. McKELVEY, *Assistant Examiner.*